United States Patent [19]

Wichman et al.

[11] 3,954,223

[45] May 4, 1976

[54] TRICKLE IRRIGATOR

[75] Inventors: William J. Wichman; Richard A. Vander Ploeg, both of Glendora, Calif.

[73] Assignee: Rain Bird Sprinkler Mfg., Corporation, Glendora, Calif.

[22] Filed: June 20, 1975

[21] Appl. No.: 588,799

[52] U.S. Cl. .............................. 239/109; 137/218; 137/521; 137/525.3; 138/43; 239/542; 239/570
[51] Int. Cl.$^2$ ...................... B05B 1/32; B05B 15/02; F16K 15/14
[58] Field of Search ........... 239/107, 109, 272, 450, 239/534, 535, 542, 570; 137/218, 521, 525.3; 138/40, 42–46

[56] References Cited
UNITED STATES PATENTS

| | | | |
|---|---|---|---|
| 2,554,790 | 5/1951 | Miller | 239/534 |
| 3,797,754 | 3/1974 | Spencer | 239/542 |
| 3,807,430 | 4/1974 | Keller | 137/525.3 X |
| 3,873,031 | 3/1975 | Reeder et al. | 239/542 |
| 3,908,694 | 9/1975 | Spears | 239/542 |

Primary Examiner—Evon C. Blunk
Assistant Examiner—Andres Kashnikow

[57] ABSTRACT

A trickle-flow irrigation valve of the type which is installable through the wall of a garden hose, and having a pressure chamber with an inlet passage from the hose and an outlet passage through a wall of the chamber in which are also formed a shallow channel and an outlet groove in the channel, communicating with the outlet passage. A flat, resilient valve element covers the outlet passage and a substantial portion of the groove and channel. The resilient valve element allows relatively high-volume, flushing flow when water is first received in the chamber, but deforms to the shape of the channel as supply pressure builds up, thus restricting flow to the outlet groove and providing a substantial pressure drop. A high supply pressure will force the valve element into the groove itself, to some degree, and a pressure regulating effect is thereby obtained. A loose-fitting outlet cover, including an attached pin engageable in the outlet passage, allows manual flushing by lifting the valve element away from the channel as the cover and pin are depressed.

8 Claims, 6 Drawing Figures

U.S. Patent   May 4, 1976   3,954,223
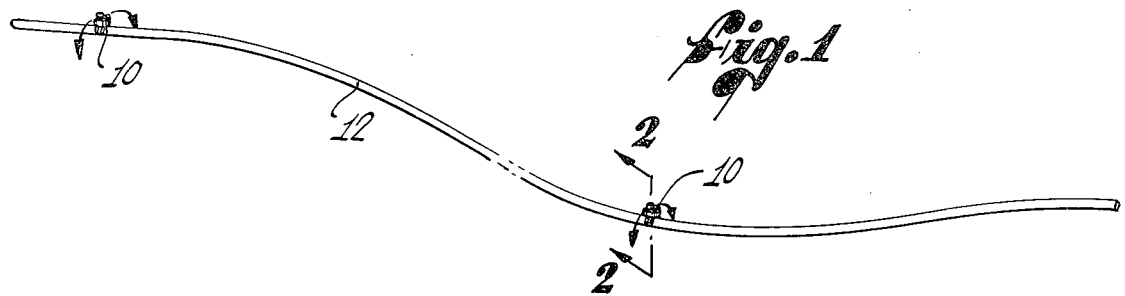
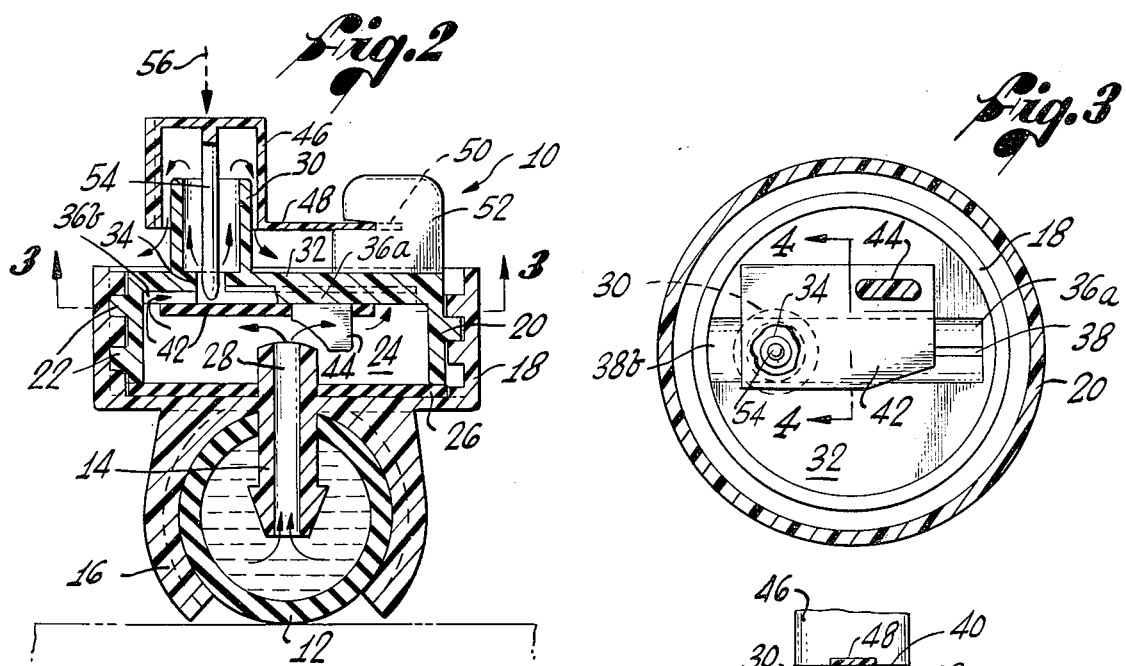
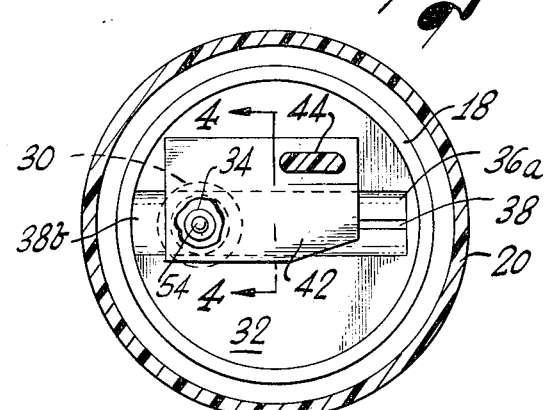
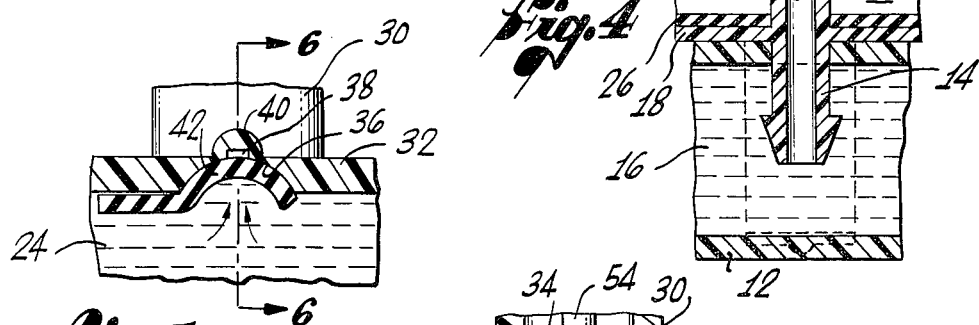
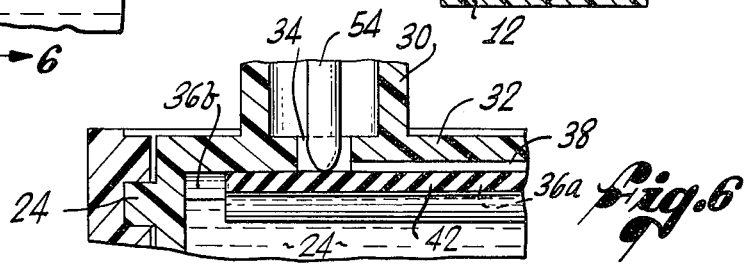

TRICKLE IRRIGATOR

BACKGROUND OF THE INVENTION

The present invention relates generally to trickle-flow irrigation valves, and, more particularly, to such valves which are installable through the wall of a water pipe or garden hose.

As is well known, it is often desirable to provide irrigation at relatively low flow rates in the order of a gallon per hour from each of a number of outlets in a common supply line, and at relatively low pressure, so that spraying does not occur. To achieve uniformity in the flow rates from the several outlets, a relatively high supply pressure is needed. This, in turn, necessitates extremely small discharge orifices at the outlets, and clogging of the outlets is therefore a significant problem. Furthermore, uniformity of flow rates cannot be attained, of course, without some form of pressure regulation.

Various trickle-flow irrigation valves have been proposed, and some of these address the clogging problem to some degree by providing flushing operations implemented in various ways. It is highly desirable in trickle-flow irrigation valves of this general type to provide for both an automatic flushing operation on turn-on of the water supply, and a manual flushing operation which can be actuated as needed in the field. In addition, an uncomplicated and easily dissassembled construction are definite and desirable advantages.

SUMMARY OF THE INVENTION

The present invention resides in an improved form of trickle-flow irrigation valve for attachment to a water supply line, such as a garden hose. Basically, and in general terms, the valve includes an inlet tube sealably insertable through the wall of a water supply hose, and a pressure chamber having an inlet passage communicating with the inlet tube, and an outlet passage through a wall of the chamber. An interior wall of the chamber has a shallow channel formed in it intersecting with the outlet passage, and an outlet groove is formed substantially in the center of the channel and also intersects with the outlet passage. A substantially flat, resilient valve element is held in position covering the outlet passage and most of the channel and groove. On an initial flow of water into the pressure chamber, a flushing action occurs, since a relatively high-volume flow occurs along the channel and groove until pressure builds up in the chamber. The supply pressure in the chamber then deforms the resilient valve element into the shallow channel, restricting flow under the element to the cross-section of the outlet groove, which is appropriately sized to produce the desired flow rate.

The outlet groove is long enough to produce a substantial frictional pressure drop between the pressure chamber and the outlet passage, so that a desired low-pressure flow is obtained. Moreover, an increased supply pressure will deform the resilient valve element further, forcing it partly into the outlet groove and thereby further limiting outlet flow and pressure. The valve therefore acts, in part, as a pressure regulator, resulting in more uniform outlet flows.

In the preferred embodiment of the invention, the outlet passage communicates with a normally upwardly directed outlet tube, and a loosely fitting cap covers the outlet tube to minimize the introduction of solid particles into the tube. A central pin, which may be formed integrally with the cap, extends through the outlet tube, and may be further extended right through the outlet passage by manually depressing the cap and thereby lifting the valve element from the outlet passage and groove. This provides a conveniently operable manual flushing operation to clear the outlet groove of any accumulated solid materials.

Another feature of the present invention is that the valve element also acts as an anti-siphon valve, since any negative pressure in the supply hose will draw the resilient valve element against the inlet passage and thereby prevent siphoning flow back into the supply hose.

In the preferred embodiment of the invention, the pressure chamber is formed as two, threadably engageable pieces, one being integral with the inlet tube, and the other including the wall which has the channel, outlet groove and outlet passage therein. The two pieces may be conveniently assembled and disassembled for cleaning or replacement of the parts. The cap and integral pin are removably and resiliently supported in position with the cap loosely fitting over the outlet tube and the pin extending down into the tube. When the cap is depressed, the pin pushes against the resilient valve element, and when the cap is released, its resilient mounting lifts and retracts the pin fully back into the outlet tube.

It will be apparent that the present invention provides a trickle-flow irrigation valve of uncomplicated and relatively low-cost construction, which provides the desirable features of automatic and manual flushing, low-pressure and low-volume flow, pressure regulation, and anti-siphoning action. Other aspects and advantages of the invention will become apparent from the following detailed description of the invention, taken in conjunction with the accompanying drawings.

BRIEF DESCRIPTION OF THE DRAWINGS

FIG. 1 is a simplified perspective view of a portion of a trickle irrigation system utilizing a number of trickle-flow valves embodying the present invention;

FIG. 2 is an enlarged sectional view of the valve taken substantially along the line 2—2 of FIG. 1, and showing the resilient valve element in a flat configuration allowing flushing flow through the valve;

FIG. 3 is a sectional view of the valve taken substantially along the line 3—3 of FIG. 2;

FIG. 4 is a fragmentary sectional view taken substantially along the line 4—4 of FIG. 3;

FIG. 5 is a further enlarged sectional view taken in same direction as FIG. 4 and showing the resilient valve element bent to its normal operative position; and FIG. 6 is a fragmentary sectional view taken in the same direction as FIG. 2, but showing the resilient valve element bent to its normal operative position.

DETAILED DESCRIPTION

As shown in the drawings for purposes of illustration, the present invention is embodied in a trickle-flow valve, indicated generally by the reference numeral 10. Usually a plurality of such valves 10 will be installed along a water supply hose 12, as shown in FIG. 1, to supply localized irrigation at low flow rates to desired points of application along the hose. As with some other trickle-flow valves of the same general type, each valve 10 has one inlet tube 14 which is inserted through a hole in the wall of the hose 12, and has a hose clamp 16, which may be integral with the valve, to hold the valve in an installed position on the hose.

As best shown in FIG. 2, the valve 10 principally includes a lower housing portion 18 and an upper housing portion 20, both of which may, as in the preferred embodiment, be of any suitable molded plastic material. Both portions 18 and 20 of the housing are substantially cylindrical in shape, and threadably engage with each other by means of screw threads 22 integrally formed on each, to define a substantially cylindrical pressure chamber 24. A flat annular seal 26 of rubber or like material is positioned in the bottom of the lower housing portion 18 and seals the pressure chamber 24 when the upper housing portion 20, which has a male thread, bears down on the seal. The inlet tube 14 is formed integrally with the lower housing portion 18 and extends through the end wall thereof to provide an inlet passage 28 from the house 12 to the pressure chamber 24. Outlet from the pressure chamber 24 is provided by an upwardly extending outlet tube 30 which is integral with the end-wall 32 of the upper housing portion 20 and extends upwardly therefrom. An outlet passage 34, which is provided in the end wall 32, is offset to one side with respect to the central inlet passage 28, and communicates with the tube 30.

On the interior side of the end-wall 32, a relatively shallow, diametric channel 36 is formed. The channel 36 intersects with the outlet passage 34 and has the cross-sectional shape of a sector of a circle. Since the outlet passage 34 is offset toward one edge of the end-wall 32, the outlet passage divides the channel 36 into one long portion 36a and one short portion 36b. At the center, or deepest region of the channel 36, and only on the long portion 36a thereof, a relatively narrow outlet groove 38 is formed, also extending across the end-wall 32 and also intersecting with the outlet passage 34. A reinforcing rib 40 extends, parallel to the groove 38, across a portion of the end-wall 32 on its outer surface.

A resilient valve element 42 in the form of a flap of rubber or similar material is supported in the pressure chamber 24 to cover the outlet passage 34 and a substantial portion of the channel 36 and outlet groove 38. More specifically, and as best shown in FIG. 6, the valve element 42 covers the outlet passage 34 completely, partly covers the short portion 36b of the channel 36, and covers most of the long portion 36a of the channel and the groove 38. In the illustrative embodiment, the valve element 42 is supported on a post 44 formed integrally with the end-wall 32, the resilient valve element having a hole therethrough for engagement with the post.

Completing the valve 10 is a loose-fitting cap 46 for the outlet tube 30, which may be of the same plastic material as the housing 18 and 20. The cap 46 is supported by means of an integral, resilient finger 48 having a forked end 50 which is removably engageable with a slotted mounting post 52 formed on the outside of the end wall 32. The cap 46 has a central pin 54 formed integrally therewith, which, when the cap is supported on the mounting post 52, extends through the outlet tube 30 and into, but not completely through, the outlet passage 34. The pin 54 fits the outlet tube 30 only very loosely, so that solid materials which may be flushed from the outlet groove 38 will be easily passed through the valve 10.

When water is first supplied to the valve 10, the valve element 42 is in a flat, undistorted configuration, as shown in FIG. 4, and a relatively fast, flushing flow can occur between the element 42 and the channel 36, up through the outlet tube 30, and out under the cap 46. As supply pressure builds up in the pressure chamber 24, the valve element 42 is pressed into the channel 36, as shown in FIGS. 5 and 6, and flow into the outlet passage 34 is restricted by the narrow cross-section of the outlet groove 38, which thereby meters the flow to a desired trickle, typically of around one gallon per hour. A pressure drop results from flow through the outlet groove 38, providing a desirable low-pressure flow from the outlet tube 30.

To some degree, and depending on the supply pressure, the resilient valve element 42 will be forced into the groove 38, thereby further restricting flow and increasing the pressure drop along the groove. Thus, the valve element 42 and the groove 38 act together as a pressure regulator to maintain a relatively constant output pressure and rate of flow.

Manual flushing of the valve 10, which may be necessitated by clogging of the outlet groove 38, is effected by depressing the cap 46, as shown by the arrow 56 in FIG. 2, so that the pin 54 lifts the valve element 42 from the surface of the channel 36, and allows a relatively high-volume flushing flow while the cap is held down. When the cap 46 is released, its resilient mounting finger 48 returns it to a normal position, pressure soon builds up in the chamber 24, and flow is again restricted by the outlet groove 38.

To prevent water in the pressure chamber 24 from being siphoned back into the hose 12, and thence to some location at a lower elevation, when the water supply is turned off, the valve element 42 also acts as an anti-siphon valve. A lowered or negative pressure in the supply hose 12 will draw the resilient valve element 42 downward, to be seated over the inlet passage 28, as shown in phantom in FIG. 4, thus preventing reverse flow through the valve 10.

It can be seen that, in addition to providing easy installation, both automatic and manual flushing operations, low-pressure and low-volume flow, pressure regulation, and anti-siphoning action, the valve 10 may be fabricated from relatively inexpensive plastic materials, and may be conveniently dismantled for cleaning, or for repair or replacement of its parts. Although a single embodiment of the invention has been described in detail for purposes of illustration, it will be appreciated that various modifications may be made without departing from the spirit and scope of the invention. Accordingly, the invention is not to be limited except as by the appended claims.

We claim:

1. A trickle-flow irrigation valve comprising:
   an inlet tube sealably insertable through the wall of a liquid supply hose;
   a pressure chamber having
      an inlet passage communicating with said inlet tube,
      at least one interior wall,
      an outlet passage through said wall,
      a shallow channel formed in said wall and intersecting with said outlet passage, and
      an outlet groove formed in said channel and also intersecting with said outlet passage; and
   a valve element of substantially flat resilient material secured at an edge thereof to cover said outlet passage and a substantial portion of said channel;
   whereby an initial flow of liquid through said inlet passage into said pressure chamber serves to flush said channel, outlet groove and outlet passage, and whereby development of full supply pressure in said pressure chamber presses said valve element into said channel and thereby limits outlet flow to the cross-section of said outlet groove, and provides a low-pressure low-volume outlet flow.

2. A trickle-flow irrigation valve as set forth in claim 1, and further comprising:
loosely-fitting pin means resiliently supported in said outlet passage and manually extendable through said outlet passage, to lift said valve element from said outlet passage and said channel, thereby providing a manual flushing operation.

3. A trickle-flow irrigation valve as set forth in claim 2, wherein said pin means includes a loosely-fitting cap resiliently supported over said outlet passage and a central pin rigidly attached to said cap and extending into said outlet passage.

4. A trickle-flow irrigation valve as set forth in claim 3, wherein said pin means fits in said outlet passage with a relatively large clearance to allow easy passage of any clogging materials flushed from said outlet groove.

5. A trickle-flow irrigation valve as set forth in claim 2, wherein said pressure chamber is formed by a first substantially cylindrical housing portion, having said inlet passage therein, and a second substantially cylindical housing portion, having said outlet passage, said channel and said outlet groove therein, said first and second housing portions being sealaby engageable with each other.

6. A trickle-flow irrigation valve as set forth in claim 1, wherein said resilient valve element is deformable part way into said outlet groove by relatively high pressures in said pressure chamber, whereby said valve element and said groove cooperate as a pressure regulator to maintain a relatively constant outlet pressure and flow.

7. A trickle-flow irrigation valve as set forth in claim 1, wherein said resilient valve element is loosely mounted to allow it to be drawn toward and to be sealed against said inlet passage on the occurrence of a negative supply pressure, thereby preventing siphoning and reverse flow from said valve.

8. A trickle-flow irrigation valve as set forth in claim 1, wherein:
said channel has a relatively long portion on one side of said outlet passage and a relatively short portion on the other side of said outlet passage; and
said outlet groove is formed only in said relatively long portion of said channel, whereby, when said valve element is pressed into said channel, outlet flow is restricted to said groove in said relatively long portion, and a desired pressure drop is produced between said pressure chamber and said outlet passage, resulting in low-pressure low-volume outlet flow.

* * * * *